United States Patent
Tombler, Jr. et al.

(10) Patent No.: US 7,648,177 B2
(45) Date of Patent: Jan. 19, 2010

(54) APPARATUS AND METHOD FOR ACTUATING OR MAINTAINING A SEAL BY DIFFERENTIAL PRESSURE

(75) Inventors: Thomas W. Tombler, Jr., Santa Barbara, CA (US); Brian Y. Lim, Santa Barbara, CA (US); Jon W. Lai, Santa Barbara, CA (US)

(73) Assignee: Atomate Corporation, Simi Valley, CA (US)

( * ) Notice: Subject to any disclaimer, the term of this patent is extended or adjusted under 35 U.S.C. 154(b) by 0 days.

(21) Appl. No.: 10/654,599

(22) Filed: Sep. 2, 2003

(65) Prior Publication Data

US 2005/0046180 A1    Mar. 3, 2005

(51) Int. Cl.
*F16L 17/02* (2006.01)
(52) U.S. Cl. .............. 285/96; 285/95; 285/106
(58) Field of Classification Search ............ 285/95, 285/96, 106
See application file for complete search history.

(56) References Cited

U.S. PATENT DOCUMENTS

| | | | |
|---|---|---|---|
| 3,383,125 A * | 5/1968 | Frost et al. ............ 285/94 |
| 3,600,010 A * | 8/1971 | Downs et al. ............ 285/96 |
| 3,874,706 A * | 4/1975 | Arnold ............ 285/24 |
| 3,944,263 A * | 3/1976 | Arnold ............ 285/96 |
| 4,045,054 A * | 8/1977 | Arnold ............ 285/18 |
| 4,121,859 A * | 10/1978 | DeMey, II ............ 285/93 |
| 4,676,531 A * | 6/1987 | Martin ............ 285/96 |
| 4,741,561 A * | 5/1988 | Morita et al. ............ 285/93 |
| 4,887,846 A * | 12/1989 | Chin et al. ............ 285/18 |
| 4,955,522 A * | 9/1990 | Stuhler ............ 228/124.6 |
| 5,098,132 A * | 3/1992 | Burton ............ 285/18 |
| 5,131,695 A * | 7/1992 | Wiser ............ 285/354 |
| 5,133,577 A * | 7/1992 | Schultze et al. ............ 285/96 |
| 5,180,008 A * | 1/1993 | Aldridge et al. ............ 277/322 |
| 5,911,447 A * | 6/1999 | Ball ............ 285/105 |
| 6,302,402 B1 * | 10/2001 | Rynders et al. ............ 277/530 |
| 6,485,062 B2 * | 11/2002 | Omiya et al. ............ 285/121.1 |
| 2002/0017785 A1 * | 2/2002 | Omiya et al. ............ 285/121.3 |

* cited by examiner

*Primary Examiner*—James M Hewitt
(74) *Attorney, Agent, or Firm*—Aka Chan LLP

(57) ABSTRACT

An apparatus that facilitates tight sealing between a first space and a second space. The second space is at least partially enclosed by a member. The apparatus includes or performs creating or maintaining a pressure difference between a pressure in a third space at a seal assembly and pressure in each of the first space and the second space; and pushing, caused by the pressure difference, against a seal in the seal assembly to tighten sealing provided by the seal.

23 Claims, 7 Drawing Sheets

APPARATUS AND METHOD FOR ACTUATING OR MAINTAINING A SEAL BY DIFFERENTIAL PRESSURE

FIELD OF THE INVENTION

The present invention relates to seals. Embodiments of the present invention are especially suited for use in leak-resistant (e.g., leak-proof) coupling of pieces made of different materials, including, for example, coupling of quartz or glass tubing with metal tubing, for example, in the production of materials or electronic devices.

BACKGROUND

Seals are needed in a variety of fields. For example, seals are needed in equipment for gas or liquid handling, electronics, and materials. For example, chemical vapor deposition (CVD), laser vaporization, and other methods for the fabrication of materials and nanostructures often use a quartz tube and a heat source, where the quartz tube needs to be connected to inlet or outlet gas lines in a leak-proof manner. A well constructed, carefully arranged and carefully operated conventional quartz-to-metal connection can sometimes accomplish such leak-proof connection. However, such a conventional quartz-to-metal connection can be relatively expensive, require that the pieces being connected are made with relatively high precision, and require care to set up and operate if leaks are to be successfully avoided.

Various metal-to-metal connections are known and can be leak-proof. Threaded metal connections, metal gaskets under compression between tightened flanges, and metal welds give quality seals. In U.S. Pat. No. 4,121,859, DeMey describes a metal-to-metal seal using a gasket of resilient material that is compressed by clamps. The gasket material forms a leak-proof seal and precludes voids at the sealing interface. In U.S. Pat. No. 5,131,695, Wiser describes an improved connection for joining two conduits with a compressed variable washer formed from polytetrafluoroethylene (Teflon) and some percentage of glass fiber. A stop shoulder prevents over-tightening of the washer. The connection is primarily for refrigeration systems and is reusable. While these schemes do yield leak-proof seals, they are generally for connecting metallic members to metallic members and for connecting members of like materials to each other.

In U.S. Pat. No. 4,955,522, Stuhler presents a process for the leak-proof joining of ceramic sealing discs to metallic attachments. The ceramic sealing surface may be active soldered or metallized then soldered to the metallic attachment. This method can form a leak-proof seal between dissimilar materials, but the seal cannot practically be re-used because the soldered seal is effectively a permanent seal. Similarly, quartz or glass can be permanently welded to a metallic attachment, but such a connection is again not readily reusable or readily changeable and can be expensive.

A gas-tight seal that can be used in elevated temperatures and thermal cycles to join tubes of dissimilar materials is described by Rynders et al. in U.S. Pat. No. 6,302,402. The described seal is particularly for sealing a metallic tube to a ceramic tube. The seal of Rynders et al. can work only when the entire seal assembly is in a pressurized chamber in which the chamber pressure is greater than the pressure within the tubes being joined. The seal is impractical and inflexible for many applications at least because of its need to be within a chamber having pressure that is greater than the pressure within the tubes being joined.

For quartz to metal connections, a single O-ring in a metal housing is frequently used in a conventional manner. However, it is difficult to consistently reproduce reliably gas-tight and leak-proof seals using a single O-ring in a conventional manner. Disproportionate forces and variations in surface features at the sealing interface can produce voids and preclude a complete seal.

A taper seal, such as at the end of a quartz tube and opening of a complementary metal member can produce good seals, but can be expensive due to the required tolerances in machining both members to be joined. Integration of O-rings into the taper seal does improve the sealing, but reproducible and complete sealing is still difficult to achieve on a consistent basis.

SUMMARY OF THE INVENTION

What is needed is an improved sealing scheme and associated methods. For example, what is needed are solutions that can overcome at least some of the deficiencies of conventional seals, for example, some of the deficiencies mentioned above.

According to an embodiment of the present invention, there is an apparatus for combining with at least a seal to seal a member. When the member is to be sealed, the member is at least partially in a first space and at least partially encloses at least a portion of a second space, the member including an opening to the second space. The apparatus comprises a housing configured to define, at least partially, a third space. The housing is configured to facilitate maintaining pressure level in the third space other than merely by exposing the third space to the first space or to the second space. A pressure difference between the third space and at least one of the first space or the second space creates a force on the seal that promotes tightness of sealing provided by the seal.

According to another embodiment of the present invention, there is a method for tight sealing between a first space and a second space, the second space being at least partially enclosed by a member. The method comprises creating a pressure difference between a pressure in a third space at a seal assembly and pressure in each of the first space and the second space; and pushing, caused by the pressure difference, against a seal in the seal assembly to tighten sealing provided by the seal.

According to another embodiment of the present invention, there is an apparatus for monitoring seal quality. The apparatus includes a housing, a sensor, and an indicator. The housing is configured to contain, at least partially, a space, pressure level within the space being indicative of reliability or quality of sealing in a seal. The sensor is one that is responsive to the pressure level or a change in the pressure level. The indicator is configured to convey information indicative of reliability or quality of sealing in the seal.

According to one embodiment of the present invention, there is a method for monitoring seal quality. The method includes maintaining a pressure level in a space, the pressure level being indicative of the reliability or quality of sealing in a seal; monitoring the pressure level; and providing an indicator based on the monitoring of the pressure level.

BRIEF DESCRIPTION OF THE DRAWINGS

In order to more extensively describe some embodiment(s) of the present invention, reference is made to the accompanying drawings. These drawings are not to be considered limitations in the scope of the invention, but are merely illustrative.

DETAILED DESCRIPTION OF SPECIFIC EMBODIMENTS

The description above and below and the drawings of the present document refer to examples of currently preferred embodiment(s) of the present invention and also describe some exemplary optional features and/or alternative embodiments. It will be understood that the embodiments referred to are for the purpose of illustration and are not intended to limit the invention specifically to those embodiments. On the contrary, the invention is intended to cover alternatives, variations, modifications and equivalents and anything that is included within the spirit and scope of the invention.

What is needed is a reusable and highly leak-resistant (e.g., leak-proof) seal assembly, and associated methods. Especially needed is for the seal assembly to be economical and suited for use in sealing a junction between dissimilar materials such as quartz and metal or glass and metal. Preferably, the seal assembly is able to withstand elevated temperatures, multiple thermal cycles, and/or operate in various environments. It is also desired that the seal assembly has, or is able to accommodate, a readily noticeable indicator of the status of the seal. Various embodiments of the present invention help satisfy various subsets of these needs.

Figure 1:
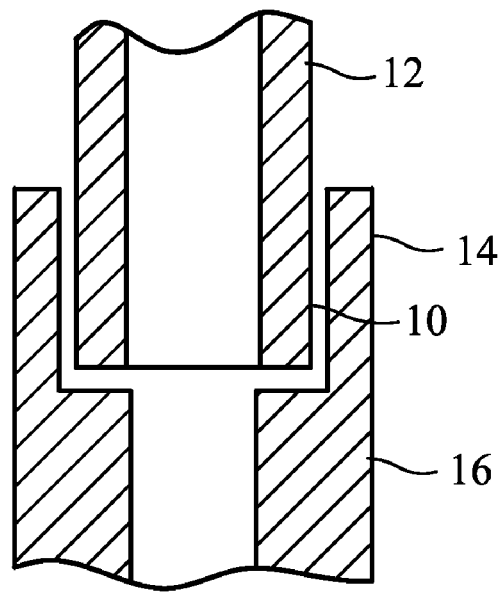
FIG. 1 is a schematic section view showing an end of a first tube and an end of a fitting or second tube that is to be sealed to the first tube.

FIG. 1 is a schematic section view showing an end 10 of a first tube 12 and an end 14 of a fitting 16 or second tube 16 that may be sought to be sealed to the first tube 12. No particular sealing mechanism is shown in FIG. 1.

Figure 2:
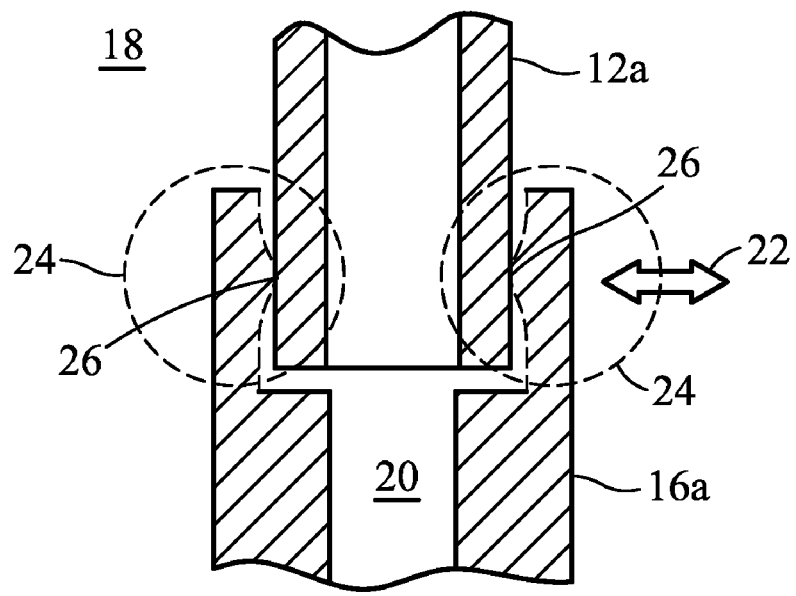
FIG. 2 is a schematic concept view showing an end of a first member and an end of a fitting or second member being sealed to the first member according to an embodiment of the present invention.

FIG. 2 is a schematic concept view showing sealing, according to some embodiments of the present invention, between a first member 12a and a fitting 16a or second member 16a. The first member 12a is at least partially in a first space 18. The fitting 16a or second member 16a at least partially encloses a second space 20. Note that the first member 12a also at least partially encloses the second space 20. An arrow 22 schematically indicates that pressure is added to or removed from some location at a portion 24 of the fitting 16a or second member 16a to tighten a sealing 26 against the first member 12a. A pressure level is maintained, at the location, that differs from pressure level in the first space 18 and/or pressure level in the second space 20. The difference in pressure exerts a force on a seal to tighten the sealing 26, for example, to make the sealing 26 leak-proof.

Figure 3A:
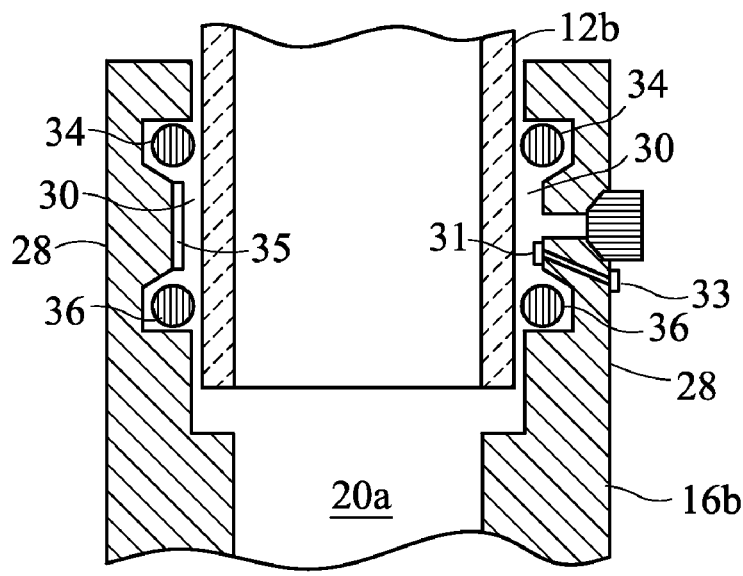
FIGS. 3A and 3B are schematic section views showing different stages of sealing, according to an embodiment of the present invention.
Figure 3B:
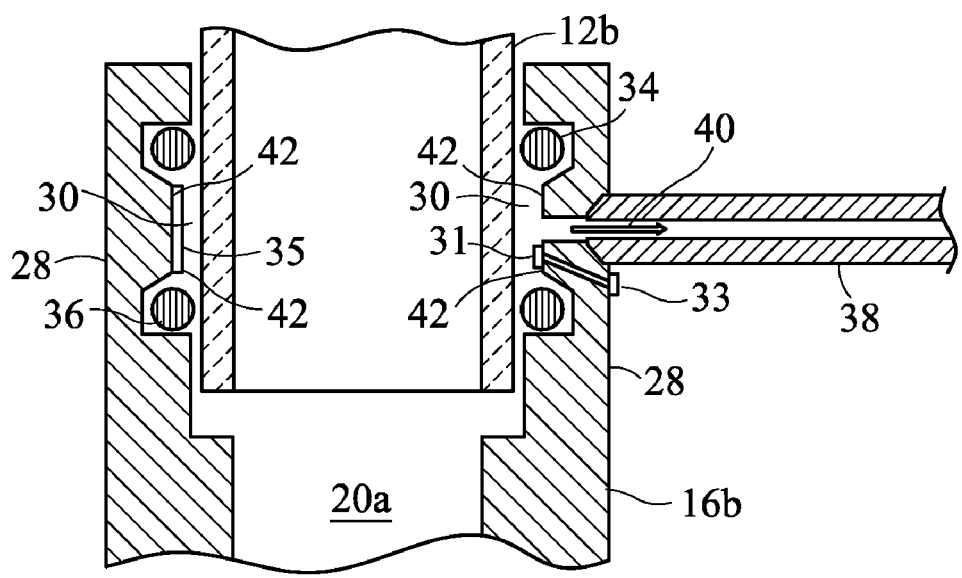

FIGS. 3A and 3B are schematic section views showing different stages of sealing, according to an embodiment of the present invention. FIG. 3A shows an end of a first member 12b, and a structure 28 that is part of a fitting 16b or a second member 16b. The first member 2b is at least partially in an environmental space 18a. Both the first member 12b and the fitting 16b or second member 16b at least partially enclose an internal space 20a. In the simple configuration shown in FIG. 3A, the first member 12b is simply a tube, and the structure 28 surrounds a segment of the first member 12b. The structure 28 helps to define a seal space 30. A plug or valve 32 (shown schematically) also helps to define or partially close off the seal space 30. The seal space may also be referred to as the third space 30, to continue the terminology of FIG. 2 ("first space 18" and "second space 20"). A first seal 34 and a second seal 36 also each surround a segment of the first member 12b. The seals 34 and 36 may be, for example, O-rings. A sensor 31 (e.g., a pressure sensor) senses the status of the seal, and an indicator 33 indicates the status of the seal. A mechanical element 35 can switchably apply a mechanical force on the seals 34 and 36 to disrupt sealing provided by the seals.

In the state shown in FIG. 3A, the first seal 34 does not (yet) tightly seal the seal space 30 from the environmental space 18a. Similarly, the second seal 36 does not (yet) tightly seal the seal space 30 from the internal space 20a. As shown, the seals 34 and 36 do not (yet) together tightly seal the internal space 20a from the environmental space 18a.

FIG. 3B is a schematic section view showing the elements from FIG. 3A under tight sealing, and undergoing tightening sealing, according to the embodiment of FIGS. 3A and 3B of the present invention. A nozzle 38 has been coupled, e.g., at least temporarily, to the structure 28. The nozzle 38 has provided, and is providing, suction to the seal space 30, as indicated by an arrow 40. The suction may be being provided via the nozzle 38 by a pump or reservoir. The suction in the seal space 30 "pulls" on the seals 34 and 36 and moves them into contact and/or into tighter contact with the structure 28 and with the first member 12b. For example, the structure may have a feature(s) 42 that leaves a gap(s) against the member 12b, and the gap(s) are plugged by the seal when the seal is "pulled" by the suction toward the gap(s). The feature(s) 42 may be, for example, protrusions or lips or the like or any other competent feature. (Of course, "pulling" by suction is merely a convenient way of referring to the pushing by a pressure that is made dominant by the suction.) Preferably, the valve 32 of FIG. 3A can be closed to maintain the tightened seal even after the nozzle 38 (and the pump or reservoir) has been decoupled from the structure 28.

The arrangement shown for demonstration in FIGS. 3A and 3B is an example of one in which pressure in the seal space 30 is capable of being maintained that differs from both pressure in the environmental space 18a and pressure in the internal space 20a. The seal space is defined, at least in part, by an external wall of the member and an internal wall of the structure 28. The arrangement is especially beneficial when the first member 12b is made of a different material as another member that is to be coupled to the first member. The other member is, e.g., the second member 16b itself or a non-shown member that is coupled (not shown) to the fitting 16b. For example, the non-shown member may be of metal and may be connected to a metal fitting 16b using any metal-to-metal connection. For example, the first member 12b may be made of quartz, glass, ceramic, plastic, or the like, or any other non-metal material, or a combination thereof. For example, the first member 12b may be a quartz tube. The fitting 16b or second member 16b may couple to, or include a stopper, plug, end piece, or blank, so as to close and seal the opening of the second member 16b.

Figure 4:
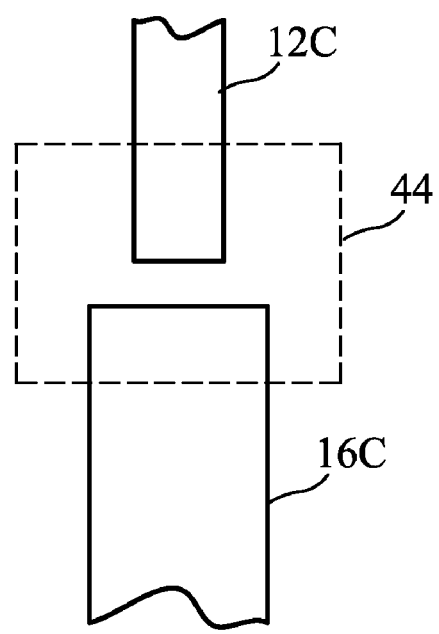
FIG. 4 is a schematic concept view showing a coupler, according to an embodiment of the present invention, and a first and a second member, wherein the coupler facilitates sealing the first member to the second member.

FIG. 4 is a schematic concept view showing a coupler 44, according to an embodiment of the present invention, and a first member 12c and a second member 16c. The coupler 44 facilitates sealing the first member 12c to the second member 16c. In operation, the coupler 44 is sealed to the first member 12c and is sealed to the second member 16c, and the first member 12c is so coupled to the member 16c.

Figure 5A:
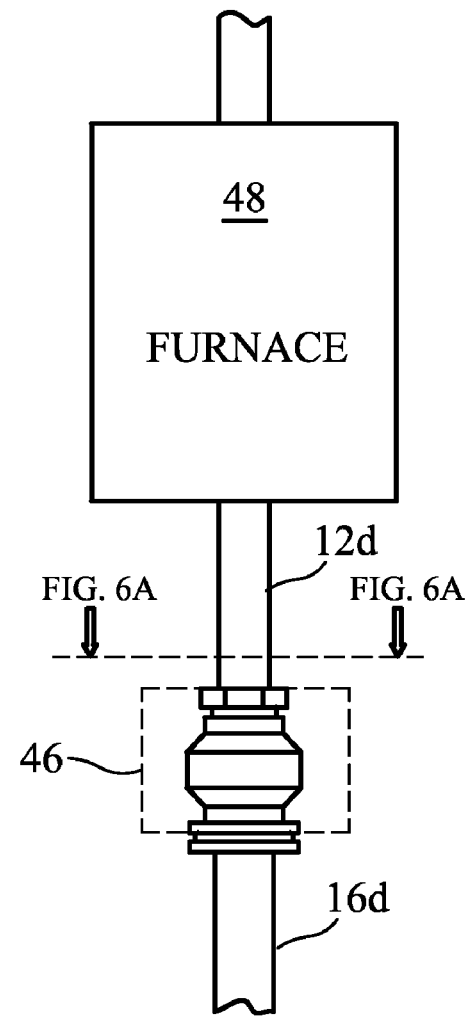
FIG. 5A is a schematic exterior view showing an embodiment of the coupler of FIG. 4, in one example operating environment.

FIG. 5A is a schematic exterior view showing a particular embodiment 46 of the coupler 44 of FIG. 4, in one example operating environment. The coupler 46 is also a particular embodiment of the sealing assembly shown in FIGS. 3A and 3B. A first member 12d is to be coupled to a second member 16d. In the example operating environment of FIG. 5A, the first member 12d may be, for example, a quartz tube coupled to a furnace 48.

Figure 5B:
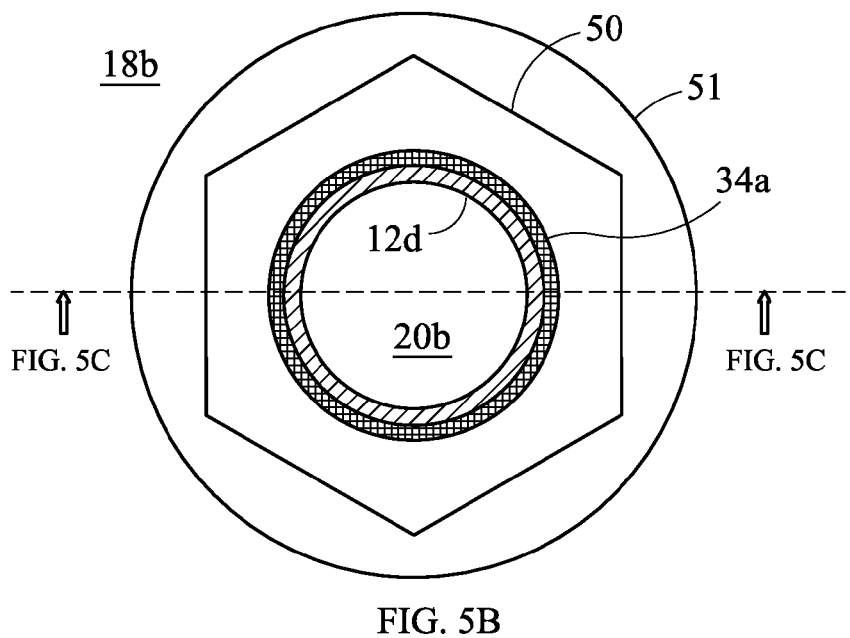
FIG. 5B is a schematic section view showing the coupler of FIG. 5A.
Figure 5C:
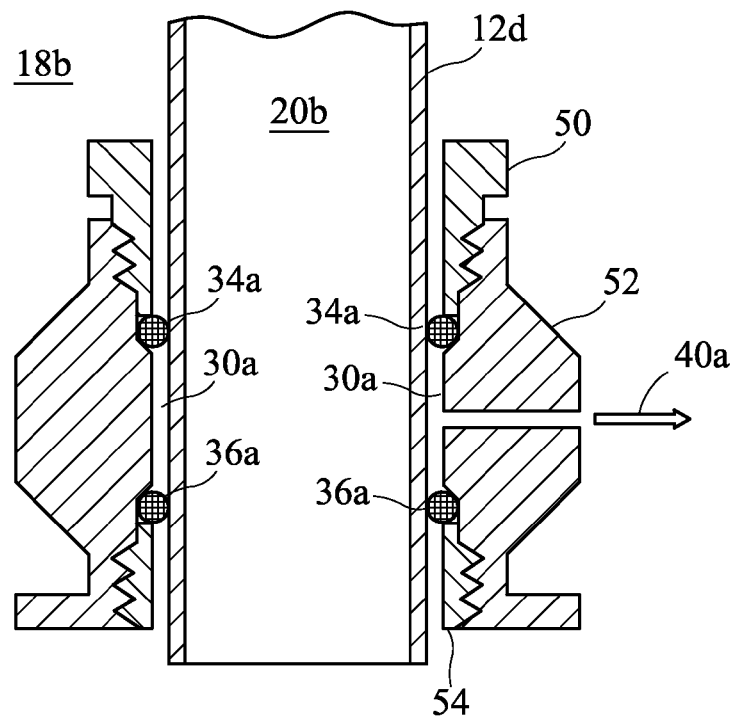
FIG. 5C is a schematic section view, perpendicular to the view of FIG. 5B, showing the coupler of FIGS. 5A and 5B.

FIG. 5B is a schematic section view showing the coupler of FIG. 5A. The section is along a radial plane relative to a longitudinal axis of the first member 12d, as indicated in FIG. 5A. FIG. 5C is a schematic section view, perpendicular to the view of FIG. 5B, as indicated by a section line in FIG. 5B. FIG. 5C shows the coupler of FIGS. 5A and 5B.

As shown in FIG. 5C, there is an environmental space 18b, the first member 12d partially encloses an internal space 20b, and a structure 52 partially defines and encloses a seal space 30a. The structure 52 may also be referred to as the housing 52. Operation of the coupler 46 is as has been discussed in connection with FIGS. 3A and 3B, and is understood by comparing FIG. 5C to FIG. 3B.

Preferably, there is a first end piece 50 and a second end piece 54 that each help keep the seals 34a and 36a in sufficient proximity to the seal space 30a for the anticipated level of evacuation of the seal space 30a to "pull" the seals 34a and 36a into tight sealing position. Thus, the end pieces 50 and 54 can free a human technician setting up the coupler 46 from having to manually position the seals 34a and 36a next to the structure or housing 52. Further the end pieces 50 and 54 can prevent the seals 34a and 36a from being blown too far away for re-tightening when the seals 34a and 36a are sought to be loosened by a burst of gas or fluid into the seal space 30a. The end pieces 50 and 54 may be separate pieces from the structure or housing 52, or they may be removably or permanently connected to the structure or housing 52 by any mechanism whatsoever, for example, threading, friction, bonding, welding, spring force, or the like, or any other competent mechanism. In FIG. 5C, the end pieces 50 and 54 are both threaded onto matching threads in the structure or housing 52. Note that, in general, the annular "groove" in which the seals 34a and 36a are situated can be allowed to be large enough such that the seals 34a and 36a can shift around slightly, as long as the suction is strong enough to pull and hold the seals 34a and 36a tightly to the sealing surfaces against which the seals 34a and 36a are to seal. However, in the embodiment shown in FIG. 5C, the end pieces 50 and 54 can be threaded far enough into the structure or housing 52 that the "groove" constrains the seals 34a and 36a, even before suction is applied, such that the end pieces 50 and 54 cause the seals 34a and 36a to already touch the surfaces against which the seals 34a and 36a are to make a seal, even before suction is applied.

According to one embodiment of the coupler as particularly shown in FIGS. 5A to 5C, there a seal assembly that includes two O-rings as seals 34a and 36a, a first end piece 50, a seal structure or housing 52, and a second end piece 54 having central channels in whole or in part. Two members 12 and 16 are to be joined by the coupler. The coupler is configured to be moved, selectively positioned and connected to the members being joined. One O-ring 34a is positioned between the first end piece 50 and the seal structure or housing 52 of the seal assembly. The seal assembly may refer to either the combined pieces of the seal housing or the entire seal element, including, e.g., the O-rings. The second O-ring 36a is positioned between the seal structure or housing 52 and second end piece 54 of the seal assembly, and there exists a volume 30a contained by the two O-rings 34a and 36a, the attached member 12, and the seal structure or housing 52. There is an opening to this small volume 30a in the seal structure or housing 52 through which means can be applied to evacuate the volume to low pressure or vacuum. The low pressure or vacuum places an inward force on the two O-rings 34a and 36a, which causes them to form a leak proof seal with the seal structure or housing 52 and attached member 12. In this way, the seal is actuated by pressure differential and a plug or shut-off valve 32 (as shown in FIG. 3A) at or connected to the opening on the seal structure or housing 52 is used to hold the pressure differential and maintain the leak-proof seal. The valve can be electively released to electively cease to promote tightness of sealing provided by the leak proof seal. The valve 32 can be any type of competent valve, for example, a valve that automatically closes upon withdrawal of the suction or pressure nozzle from the seal assembly. Generally, the valve 32 may be a check valve, a manual valve, or any other competent valve, whether it uses spring-loading, balls, disks, or whatever other competent mechanisms. Valves are well known.

The O-rings can be plastic, rubber, silicone, Teflon, nitrile, Viton, fluorosilicone, neoprene, Kalrez, polyurethane, vulcanized, metal, or the like, or any other competent material, or a combination of materials. The members to be joined can be of like or dissimilar materials, including metal, quartz, glass, ceramic, plastic, or other material. The members can be cylindrical, tubular, ellipsoidal or other shape, and one of the members can be a plug, stopper, end-piece, or blank. One or all of the members may be able to hold fluid or gas, either statically or flowing. The leak-proof seal may be opened or unsealed by opening the small volume contained by the O-rings, attached member, and second piece, to atmosphere or gases such as compressed air, nitrogen, argon, helium, hydrogen, or other gas. The small volume may also be pressurized to higher than environmental pressure, e.g., higher than atmospheric pressure, to open the seal. This higher pressure may be restricted to be below a certain amount, e.g., below 200 pounds per square inch. The pressurization removes the inward forces on the O-rings and allows the members to be more easily separated. In one embodiment, the coupler is for use in an environment wherein chemicals are present, and the pressurization is by gas or fluid that comprises an inert gas or fluid that does not react with the chemicals. The seal is reusable and through selection of materials for the seal assembly and O-rings, can operate in elevated temperatures, multiple thermal cycles, toxic gas or material environments, flammable gas environments, and in various pressure environments. Either or both O-rings can be intentionally configured, e.g., sized, such that if they are not being tightened by suction, then they will not provide leak-proof sealing. An O-ring is an example of a seal that, when sectioned cross to the O-ring's axis into a planar ring shape, has an external periphery having only positive curvature.

The coupler can include a sensor and an indicator of the status of the seal. The indication can reveal that the seal is in operation and leak-proof or that it is opened and unsealed. The indicator can be visual, such as by LED, a flashing light source, an analogue or digital gauge, an extending or retracting button, or a color change, or the like or any other competent mechanism. The indicator can also be audio, e.g., a buzzer or bell or voice announcement or alarm, or the like or any other competent mechanism, or a combination of visual and audio or any other sensory input. The sensor can be a sensor of the pressure level in the seal space. The indicator can be a continuous indicator and/or an alarm that is raised, or is made especially apparent, in case of seal failure. The sensor can also include a wired or wireless transmitter that sends signals to a monitoring computer or pager or telephone, or the like.

A push-rod, slide, or other device can be used to open the O-ring seal. This may be used when the seal does not easily unseal after the volume contained by the two O-rings, the attached member, and the second piece is opened to atmospheric pressure or higher pressure. A mechanical force is imparted on the O-rings, attached member, or seal assembly to break the leak-proof seal.

According to another embodiment, the seal assembly is configured so that the small volume contained by the O-rings, the attached member, and the second piece is pressurized to place an outward force on the O-rings. The O-rings are forced against the seal assembly (housing) and the attached member to form the leak-proof seal. The seal is actuated by the differential pressure between the higher pressure in the small contained volume and the outside pressure.

In some embodiments of the invention, the seal housing is be configured so that only one O-ring or other type of seal is needed, where the O-ring is tightly fit between two pieces of the housing with the small open volume above it. This small volume is pressurized and the O-ring is forced against the attached member to form the leak-proof seal.

According to a specific embodiment of the invention, a leak-proof seal assembly is used for connecting quartz, glass, ceramic, or plastic to metal and is used for the production of materials and nanostructures. The nanostructures include nanowires, nanotubes, carbon nanotubes, nanoparticles, or thin films of materials where at least one of the dimensions of the structures is less than 100 nanometers. The nanostructures may be produced by chemical vapor deposition, laser vaporization, and other known method. These techniques can utilize the leak-proof seals to add control, eliminate contamination and safety problems, and achieve more reproducible results. More specifically, for the synthesis of carbon nanotubes, the leak-proof seal precludes oxygen or air leaks at the sealing interfaces. This is a very important concern for quality synthesis of the carbon nanotubes at high temperatures, where oxygen can damage or destroy the carbon nanotubes and hinder or completely prevent synthesis.

Generally, seal assemblies according to embodiments of the present invention may be large or small, as appropriate to the member(s) being sealed. According to a specific embodiment, the leak-proof seal assembly is used for connecting tubing or other members having an outside diameter that is no less than ⅛ of an inch. For example, the central channel of a coupler according to the embodiment is no less than ⅛ of an inch. Couplers can also be restricted to couple members having a diameter that is less than, for example, 16 inches.

According to an embodiment of the invention, a reusable leak-proof seal apparatus for connecting multiple members is provided that includes two O-rings and a seal assembly housing. The volume is contained between the two O-rings, one of the members, and the seal assembly housing. This volume is evacuated to low pressure or to vacuum, which results in an inward force on the O-rings and forms a leak-proof and gas-tight seal. The present invention is especially suited for quartz or glass to metal connections, such as in some heated furnace equipment setups. The seal assembly may include an indicator of the nature of the seal, particularly whether it is closed and fluid-tight or open and unsealed. In an alternative embodiment, the volume is pressurized and an outward force on the O-rings brings about the differential pressure actuated seal.

Figure 6A:
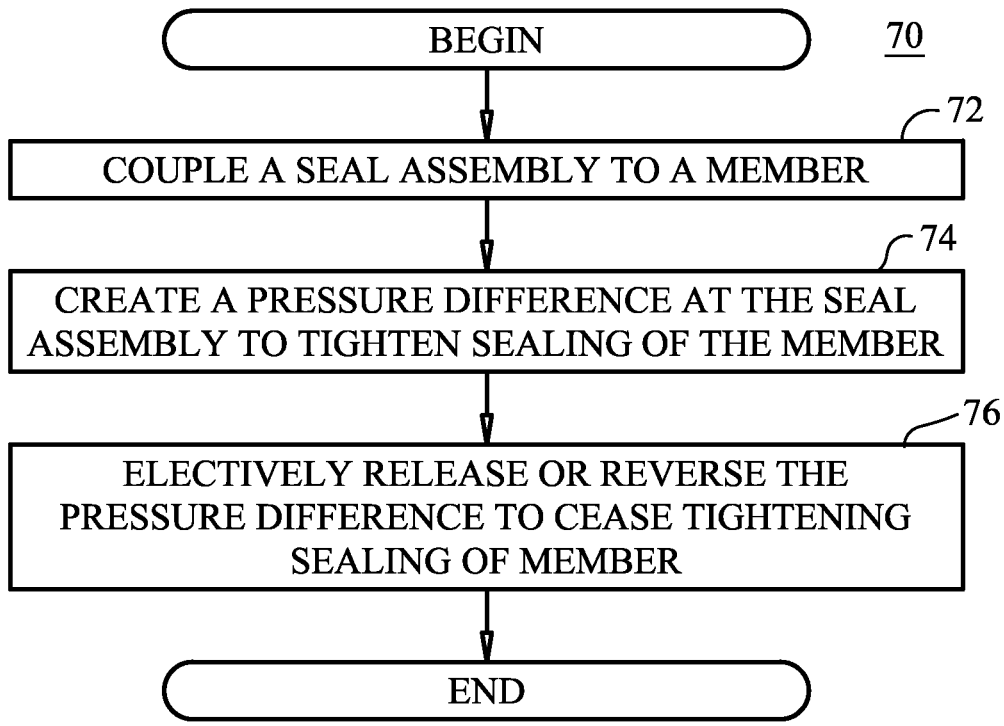
FIG. 6A is a schematic flowchart indicating a sealing method according to an embodiment of the present invention.

FIG. 6A is a schematic flowchart indicating a sealing method 70 according to an embodiment of the present invention. In a step 72, a seal assembly is coupled to a member. For example, the seal assembly may be an embodiment of the present invention as is discussed in the present document. In a step 74, a pressure difference is created at the seal assembly to tighten sealing of the member. In a step 76, the pressure difference is electively reduced or eliminated or reversed to cease tightening sealing of the member, which is one exemplary way to electively cease to promote tightness of sealing.

Figure 6B:
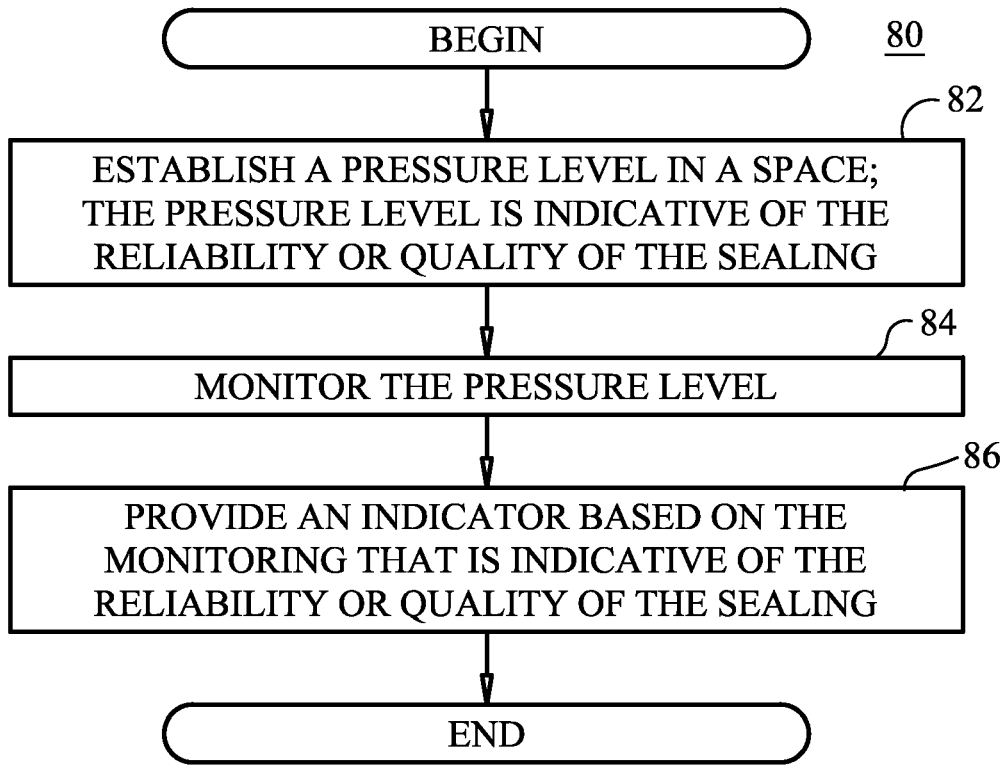
FIG. 6B is a schematic flowchart indicating a seal-quality monitoring method according to an embodiment of the present invention.

FIG. 6B is a schematic flowchart indicating a method 80 for monitoring seal quality according to an embodiment of the present invention. In a step 82, a pressure level is established in a space. The pressure level is indicative of the reliability or quality of sealing in a seal. For example, the pressure level may be the pressure level in the seal space discussed in connection with FIGS. 3A, 3B, 5A and 5B. In a step 84, the pressure level is monitored. In a step 86, an indicator is provided based on the monitoring of the pressure level from the step 84.

FIGS. 7A-7F are schematic section views each showing the end of a first member and the end of a fitting or second member to be sealed to the first member according to various embodiments of the present invention.

Figure 7A:
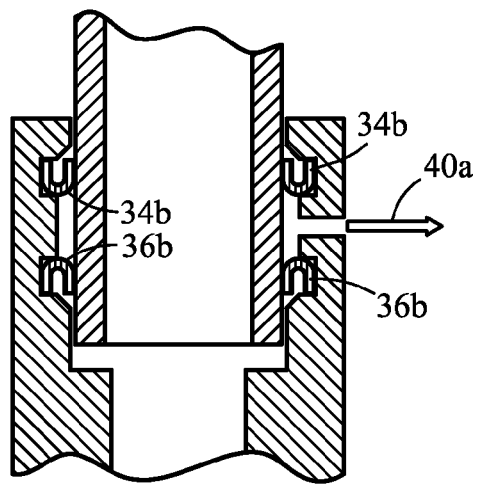
FIGS. 7A-7F are schematic section views each showing the end of a first member and the end of a fitting or second member to be sealed to the first member according to various embodiments of the present invention.

In FIG. 7A, an embodiment of the seal assembly of FIGS. 3A and 3B is shown in which seals 34b and 36b are not O-rings but are seals having a concave surface, such as taught in U.S. Pat. No. 6,302,402, to Rynders et al., which is hereby incorporated by reference. Pressure applied to the concave surface tends to flex the seals in a manner tending to reduce the concavity of the surface. This flex tightens the seals.

Figure 7B:
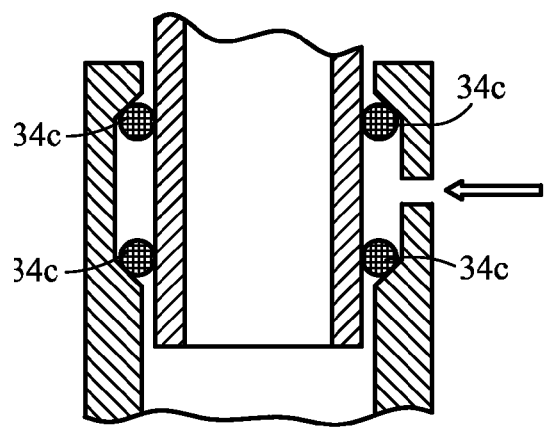

In FIG. 7B, a seal assembly creates a pressure difference by applying high pressure, and not suction, to a seal space. The high pressure pushes two seals 34c, shown as O-rings, tighter against gaps between the seal housing and the member being sealed.

Figure 7C:
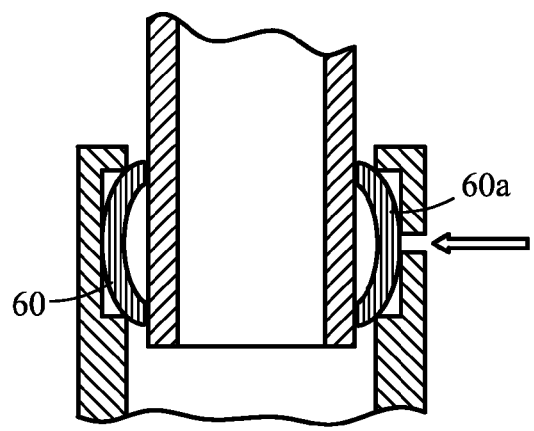
Figure 7D:
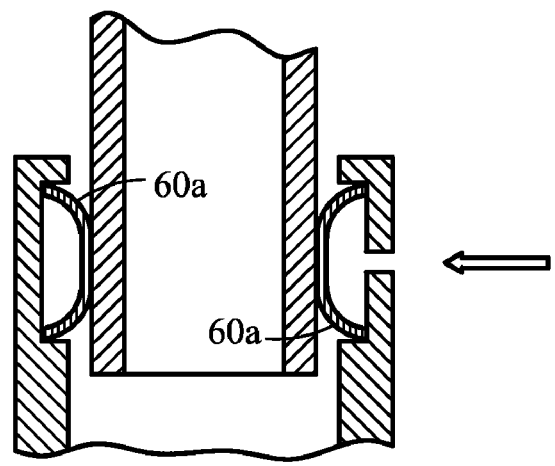

In FIG. 7C, a seal assembly also creates a pressure difference by applying high pressure, and not suction, to a seal space. FIG. 7C shows that, instead of two separate seals, such as two O-rings, a single seal (or two mutually linked seals) may be used. The single seal shown is one that has a bowed cross section. The pressure difference tends to unbow the seal, to thereby tighten both the sealing between the environmental space and the seal space and also the sealing between the internal space and the seal space. FIG. 7D shows another embodiment of the seal assembly discussed in connection with FIG. 7C. The seal assembly of FIG. 7D is shown as using a seal such as the seals taught in the incorporated U.S. Pat. No. 6,302,402, to Rynders et al.

Figure 7E:
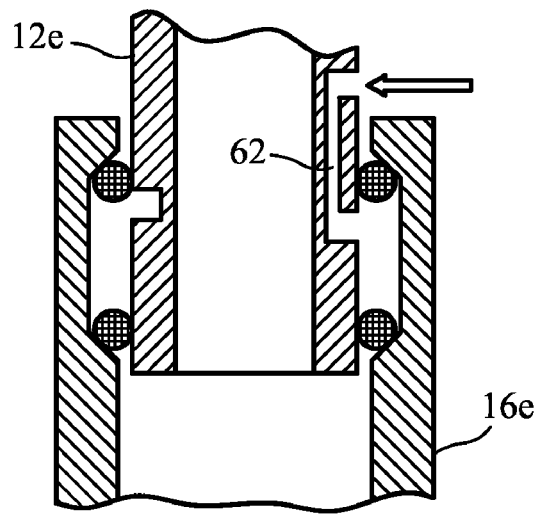

In FIG. 7E, a seal assembly receives pressure into its seal space not directly via an external opening in the seal-space housing 16e. Instead, the seal assembly receives its pressure via a channel 62 that is defined by a member 12e that is being sealed. Similarly, for suction-based seal assemblies according to the present invention, the pressure received can be negative pressure, or suction, and thus the seal space can be evacuated from such a channel.

Actually, in FIG. 7E, the shown portion of member 12e can be thought of as a portion of an embodiment of a coupler 44 of FIG. 4, and seal-space housing 16e can be thought of as a member that is being sealed that has had an internal groove scored into its interior wall, near its opening edge. More generally, in the drawings of the present document, the features of the seal housing or second member may instead be considered to be features of the first member, and vice versa.

Figure 7F:
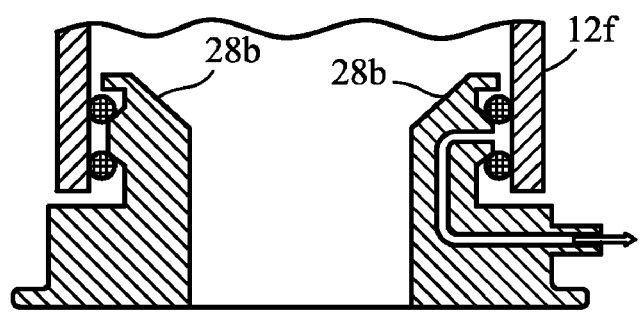

In FIG. 7F, a seal assembly is shown that creates a seal against an internal wall of a member 12f that is being sealed. The seal assembly shown is a suction-based embodiment using O-rings, but of course other embodiments may also similarly be configured to use the interior of the member 12f for sealing. For example, the seal assembly is a through coupler, but an end-cap embodiment can also be used that is closed at the bottom of FIG. 7F.

Throughout the description and drawings, example embodiments are given with reference to specific configurations. It will be appreciated by those of ordinary skill in the art that the present invention can be embodied in other specific forms. The scope of the present invention, for the purpose of the present patent document, is not limited merely to the specific example embodiments of the foregoing description, but rather is indicated by the appended claims. All changes that come within the meaning and range of equivalents within the claims are to be considered as being embraced within the spirit and scope of the claims.

What is claimed is:

1. A sealing apparatus comprising:
a tube;
a housing having first and second ends and a channel;
a first end piece and a second end piece connected by a mechanism to the first and second housing ends respectively;
said tube disposed within said housing;
first and second seals between said tube and said housing;
a seal space defined between said seals, said housing and said tube; and
means for applying pressure to said seal space via the channel to place an inward force on said seals pulling the seals towards one another and creating a leak-proof seal between said housing and said tube,
wherein said seal space is capable of being maintained at a pressure different from the ambient pressure and the pressure within the tube,
wherein said end pieces aid in maintaining said seals in position in said seal space, and
wherein said housing is of a first material and said tube is of a different material and selected from the group consisting of quartz, glass, ceramic, and plastic.

2. The apparatus according to claim 1, wherein said housing comprises a stopper or plug so as to close and seal an opening of said channel.

3. The apparatus according to claim 1, further comprising an indicator that indicates whether the seal is operable and leak-proof or improperly operating.

4. The apparatus according to claim 3, wherein said indicator comprises a visual indicator.

5. The apparatus according to claim 3, wherein said indicator comprises an audio indicator.

6. The apparatus according to claim 1, wherein the means for applying pressure is a pump or reservoir.

7. The apparatus according to claim 1, wherein a closing device or shut-off valve is connected to an opening of said channel to maintain the pressure differential in said seal space and maintain the leak-proof seal.

8. The apparatus according to claim 1, wherein a closing device or shut-off valve is connected to an opening of said channel to reduce or eliminate the pressure differential.

9. The apparatus according to claim 1, further comprising a mechanical element that switchably applies a mechanical force on the seals to disrupt sealing.

10. The apparatus according to claim 1, configured to be compatible for use with equipment for at least one element of the group consisting of chemical vapor deposition, laser vaporization, chemical sensing, gas sensing, spectrometry, chromatography, electronics, energy conversion, piping, plumbing, gas lines, and fluid lines.

11. The apparatus according to claim 1, wherein the first material comprises a metal.

12. The apparatus according to claim 1, wherein said seal space is capable of being maintained at a pressure lower than the ambient pressure and the pressure within the tube.

13. A sealing apparatus comprising:
a tube;
a housing having first and second ends and a channel;
a first end piece and a second end piece connected by a mechanism to the first and second housing ends respectively;
said tube disposed within said housing;
first and second seals between said tube and said housing;
a seal space defined between said seals, said housing and said tube; and
a pump to apply pressure to said seal space via the channel to place an inward force on said seals pulling the seals towards one another and creating a leak-proof seal between said housing and said tube,
wherein said seal space is capable of being maintained at a pressure different from the ambient pressure and the pressure within the tube,
wherein said end pieces aid in maintaining said seals in position in said seal space, and
wherein said housing is of a first material and said tube is of a different material and selected from the group consisting of quartz, glass, ceramic, and plastic.

14. The apparatus according to claim 13, wherein said housing comprises a stopper or plug so as to close and seal an opening of said channel.

15. The apparatus according to claim 13, further comprising an indicator that indicates whether the seal is operable and leak-proof or improperly operating.

16. The apparatus according to claim 15, wherein said indicator comprises a visual indicator.

17. The apparatus according to claim 15, wherein said indicator comprises an audio indicator.

18. The apparatus according to claim 13, wherein a closing device or shut-off valve is connected to an opening of said channel to maintain the pressure differential in said seal space and maintain the leak-proof seal.

19. The apparatus according to claim 13, wherein a closing device or shut-off valve is connected to an opening of said channel to reduce or eliminate the pressure differential.

20. The apparatus according to claim 13, further comprising a mechanical element that switchably applies a mechanical force on the seals to disrupt sealing.

21. The apparatus according to claim 13, configured to be compatible for use with equipment for at least one element of the group consisting of chemical vapor deposition, laser vaporization, chemical sensing, gas sensing, spectrometry, chromatography, electronics, energy conversion, piping, plumbing, gas lines, and fluid lines.

22. The apparatus according to claim 13, wherein the first material comprises a metal.

23. The apparatus according to claim 13, wherein said seal space is capable of being maintained at a pressure lower than the ambient pressure and the pressure within the tube.

* * * * *